No. 884,204. PATENTED APR. 7, 1908.
H. H. PIPER.
FOLDING SEAT FOR VEHICLES.
APPLICATION FILED JULY 29, 1907.
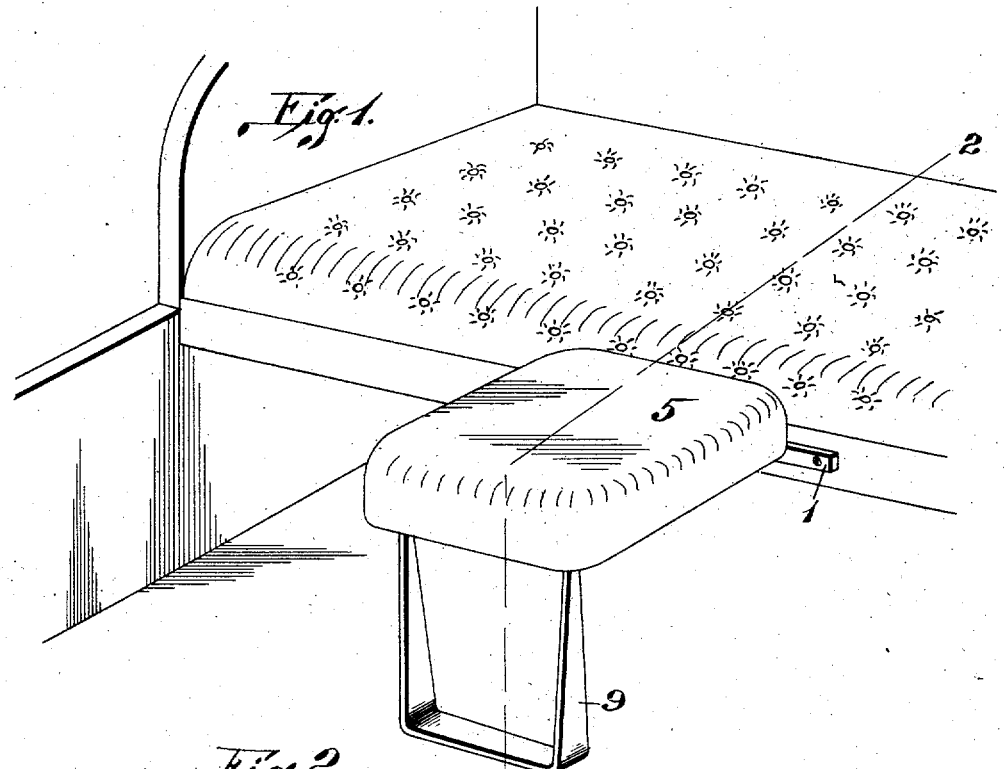
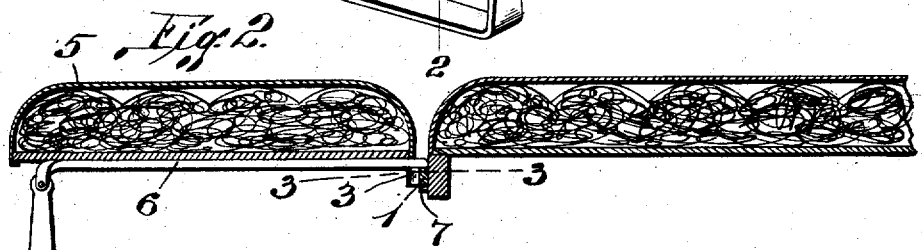
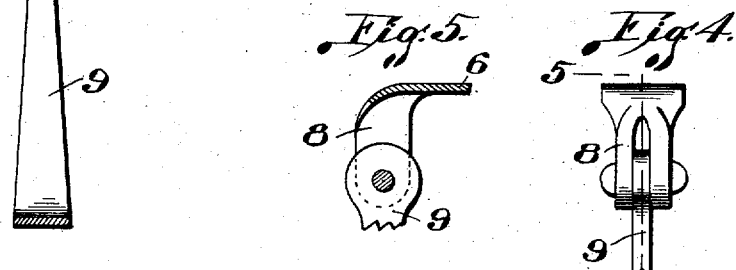
Attest:
E. M. Harrington
M. P. Smith
Inventor:
H. H. PIPER,
By Higdon & Longan
Att'ys

UNITED STATES PATENT OFFICE.

HERBERT H. PIPER, OF JACKSON, MISSOURI, ASSIGNOR OF THIRTEEN-TWENTIETHS TO R. T. HENDERSON, OF JACKSON, MISSOURI.

FOLDING SEAT FOR VEHICLES.

No. 884,204.

Specification of Letters Patent.

Patented April 7, 1908.

Application filed July 29, 1907. Serial No. 386,169.

*To all whom it may concern:*

Be it known that I, HERBERT H. PIPER, a citizen of the United States, and resident of Jackson, Cape Girardeau county, Missouri, have invented certain new and useful Improvements in Folding Seats for Vehicles, of which the following is a specification containing a full, clear, and exact description, reference being had to the accompanying drawings, forming a part hereof:

My invention relates to a folding seat for vehicles, my object being to provide a simple and inexpensive folding seat which is detachably positioned adjacent the fixed seat of a vehicle, thus increasing the carrying capacity of the vehicle; and which folding seat, when not in use, can be folded so as to occupy a comparatively small space.

To the above purposes, my invention consists in certain novel features of construction and arrangement of parts, which will be hereinafter more fully set forth, pointed out in the claims, and illustrated in the accompanying drawings, in which:

Figure 1 is a perspective view of a vehicle seat, and showing my improved folding seat in position for use in front of the central portion of a vehicle seat; Fig. 2 is a vertical section taken on the line 2—2 of Fig. 1; Fig. 3 is a horizontal section taken on the line 3—3 of Fig. 2; Fig. 4 is a front elevation of a hinge joint I make use of in carrying out my invention; Fig. 5 is a vertical section taken on the line 5—5 of Fig. 4.

Referring by numerals to the accompanying drawings: 1 designates a plate, preferably constructed of metal, said plate being secured in any suitable manner to the front rail of the vehicle seat, and there being a pair of vertically disposed sockets 3 formed on said plate, adjacent its ends.

5 designates the body portion of the folding seat, which is preferably cushioned and upholstered to conform with the fixed vehicle seat, and secured to the under side of the body 5 is a pair of straps 6, the rear ends of which are bent downwardly, as designated by 7, so as to be engaged in the sockets 3. The forward ends of the strap 6 are bent downward, and bifurcated, as designated by 8; and hinged to these bifurcated ends are the upper ends of a U-shaped leg 9, which, when swung into a vertical plane, rests upon the floor or bottom of the vehicle and supports the outer end of the body portion 5 of the seat.

When the folding seat is not in use, the rear ends of the strap 6 are disengaged from the sockets 3, and the leg 9 is folded against the under side of the body portion of the seat, and thus said folding seat occupies a comparatively small space, and may be readily packed away beneath the fixed seat.

A folding seat of my improved construction is simple and inexpensive, comprises a minimum number of parts, is readily attached or detached, and provides simple means whereby the seating capacity of the vehicle is increased.

I claim:—

1. The herein described folding seat for vehicles, comprising a body portion, a pair of straps secured to the under side thereof, the rear ends of which straps are bent downward, and the forward ends of which straps are bent downward, and bifurcated, and a U-shaped leg, the upper ends of which are pivotally connected to the bifurcated forward ends of the straps.

2. The combination with a vehicle and its seat, of a socket plate secured to the front face of the seat rail, an auxiliary seat, a pair of straps secured to the under side thereof, the rear ends of which straps are bent downward and adapted to engage the socket plate, the forward ends of which straps are bent downward and bifurcated, and a U-shaped leg, the upper ends of which are pivotally connected to the bifurcated forward ends of the straps.

In testimony whereof, I have signed my name to this specification, in presence of two subscribing witnesses.

HERBERT H. PIPER.

Witnesses:
WILLIAM PAAR,
LEON CLIPPOD.